United States Patent
Lu et al.

(10) Patent No.: US 10,644,527 B2
(45) Date of Patent: May 5, 2020

(54) RECHARGEABLE WIRELESS MOUSE, WIRELESS CHARGING DEVICE AND METHOD THEREOF

(71) Applicants: DEXIN ELECTRONIC LTD., Dongguan, Guangdong (CN); DEXIN CORPORATION, New Taipei (TW)

(72) Inventors: Ho-Lung Lu, New Taipei (TW); Pai-Yang Chou, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 130 days.

(21) Appl. No.: 15/841,495

(22) Filed: Dec. 14, 2017

(65) Prior Publication Data
US 2019/0190298 A1   Jun. 20, 2019

(51) Int. Cl.
*H02J 7/02* (2016.01)
*G06F 3/0354* (2013.01)
(Continued)

(52) U.S. Cl.
CPC .......... *H02J 7/025* (2013.01); *G06F 3/03543* (2013.01); *H02J 7/04* (2013.01);
(Continued)

(58) Field of Classification Search
CPC ....................................................... H02J 7/02
(Continued)

(56) References Cited

U.S. PATENT DOCUMENTS

| | | | |
|---|---|---|---|
| 2009/0309550 A1 | 12/2009 | Liu | |
| 2014/0015478 A1* | 1/2014 | Von Novak | H02J 7/0004 320/108 |

(Continued)

FOREIGN PATENT DOCUMENTS

| | | |
|---|---|---|
| TW | 200952303 A | 12/2009 |
| TW | 201636787 A | 10/2016 |

(Continued)

*Primary Examiner* — Robert Grant
(74) *Attorney, Agent, or Firm* — Li & Cai Intellectual Property (USA) Office (57) ABSTRACT

A rechargeable wireless mouse includes a wireless electrical-energy-receiving circuit, a transformation circuit, a wireless transmission circuit and a control circuit. The wireless electrical-energy-receiving circuit receives an electromagnetic energy from a charging plate. The transformation circuit is electrically connected to the wireless electrical-energy-receiving circuit and transforms the electromagnetic energy into an electric potential energy. The wireless transmission circuit transmits a control signal to the charging plate. The control circuit is electrically connected to the transformation circuit and the wireless transmission circuit. The control circuit receives the electric potential energy transmitted by the transformation circuit and outputs the control signal to the charging plate according to the electric potential energy. The control signal controls the charging plate such that the charging power supplied by the charging plate and received by the rechargeable wireless mouse switches between a first charging mode and a second charging mode.

17 Claims, 4 Drawing Sheets

(51) Int. Cl.
  *H02J 50/90* (2016.01)
  *H02J 7/04* (2006.01)
  *H02J 50/12* (2016.01)
  *H02J 50/80* (2016.01)
(52) U.S. Cl.
  CPC ............. *H02J 50/12* (2016.02); *H02J 50/80* (2016.02); *H02J 50/90* (2016.02)
(58) Field of Classification Search
  USPC ........................................................ 320/108
  See application file for complete search history.

(56) References Cited

U.S. PATENT DOCUMENTS

| | | | | |
|---|---|---|---|---|
| 2015/0048687 | A1* | 2/2015 | Wang | H01F 38/14 |
| | | | | 307/104 |
| 2015/0155718 | A1* | 6/2015 | Jung | H01F 38/14 |
| | | | | 307/104 |
| 2016/0085322 | A1* | 3/2016 | Park | G06F 1/266 |
| | | | | 345/163 |
| 2017/0357337 | A1 | 12/2017 | Chou | |

FOREIGN PATENT DOCUMENTS

| TW | 201644149 A | 12/2016 |
|---|---|---|
| TW | I577107 B | 4/2017 |
| TW | M548387 U | 9/2017 |

* cited by examiner

RECHARGEABLE WIRELESS MOUSE, WIRELESS CHARGING DEVICE AND METHOD THEREOF

BACKGROUND OF THE INVENTION

1. Field of the Invention

The present disclosure relates to a wireless mouse; more particularly, to a rechargeable wireless mouse, a wireless charging device and a method thereof.

2. Description of Related Art

Traditionally, a mouse is connected to a computer through a wire so as to control the cursor shown on the monitor. In recent years, wireless mouse has been provided to solve the inconvenience of wired mouse and has been widely accepted by most users. The wireless mouse in the prior art runs on a battery. When the battery inside the mouse runs out of charge, a replacement of battery is required. A wireless charging method has been developed in which a charging plate is used to charge a rechargeable wireless mouse. However, poor charging efficiency of the charging plate remains a problem.

SUMMARY OF THE INVENTION

One embodiment of the present disclosure provides a rechargeable wireless mouse including a wireless electrical-energy-receiving circuit, a transformation circuit, a wireless transmission circuit and a control circuit. The wireless electrical-energy-receiving circuit receives an electromagnetic energy from a charging plate. The transformation circuit is electrically connected to the wireless electrical-energy-receiving circuit and transforms the electromagnetic energy into an electric potential energy. The wireless transmission circuit transmits a control signal to the charging plate. The control circuit is electrically connected to the transformation circuit and the wireless transmission circuit. The control circuit receives the electric potential energy transmitted by the transformation circuit and outputs the control signal to the charging plate via the wireless transmission circuit according to the electric potential energy. The control signal controls the charging plate in a manner such that the charging power supplied by the charging plate and received by the rechargeable wireless mouse switches between a first charging mode and a second charging mode, and the charging power of the first charging mode is higher than that of the second charging mode.

Another embodiment of the present disclosure provides a wireless charging device including a charging plate and a rechargeable wireless mouse. The rechargeable wireless mouse includes a wireless electrical-energy-receiving circuit, a transformation circuit, a wireless transmission circuit and a control circuit. The wireless electrical-energy-receiving circuit wirelessly receives an electromagnetic energy from a charging plate. The transformation circuit is electrically connected to the wireless electrical-energy-receiving circuit and transforms the electromagnetic energy into an electric potential energy. The wireless transmission circuit transmits a control signal to the charging plate. The control circuit is electrically connected to the transformation circuit and the wireless transmission circuit. The control circuit receives the electric potential energy transmitted by the transformation circuit and outputs the control signal to the charging plate via the wireless transmission circuit according to the electric potential energy. The control signal controls the charging plate in a manner such that the charging power supplied by the charging plate and received by the rechargeable wireless mouse switches between a first charging mode and a second charging mode, and the charging power of the first charging mode is higher than that of the second charging mode.

Another embodiment of the present disclosure provides a method for charging a rechargeable wireless mouse applicable to a charging plate that charges the rechargeable wireless mouse. The method includes: the rechargeable wireless mouse outputting a control signal to the charging plate according to the condition of receiving an electromagnetic energy from the charging plate; and the charging plate supplying the rechargeable wireless mouse with a charging power according to the control signal, in which the charging power switches between a first charging mode and a second charging mode, the charging power of the first charging mode being higher than that of the second charging mode.

For a better understanding of the present disclosure, the following embodiments are provided along with illustrations to facilitate the disclosure of the present disclosure.

DETAILED DESCRIPTION OF THE PREFERRED EMBODIMENTS

The aforementioned illustrations and following detailed description are exemplary for the purpose of further explaining the scope of the present disclosure. Other objectives and advantages related to the present disclosure will be illustrated in the following description and appended drawings.

Figure 1:
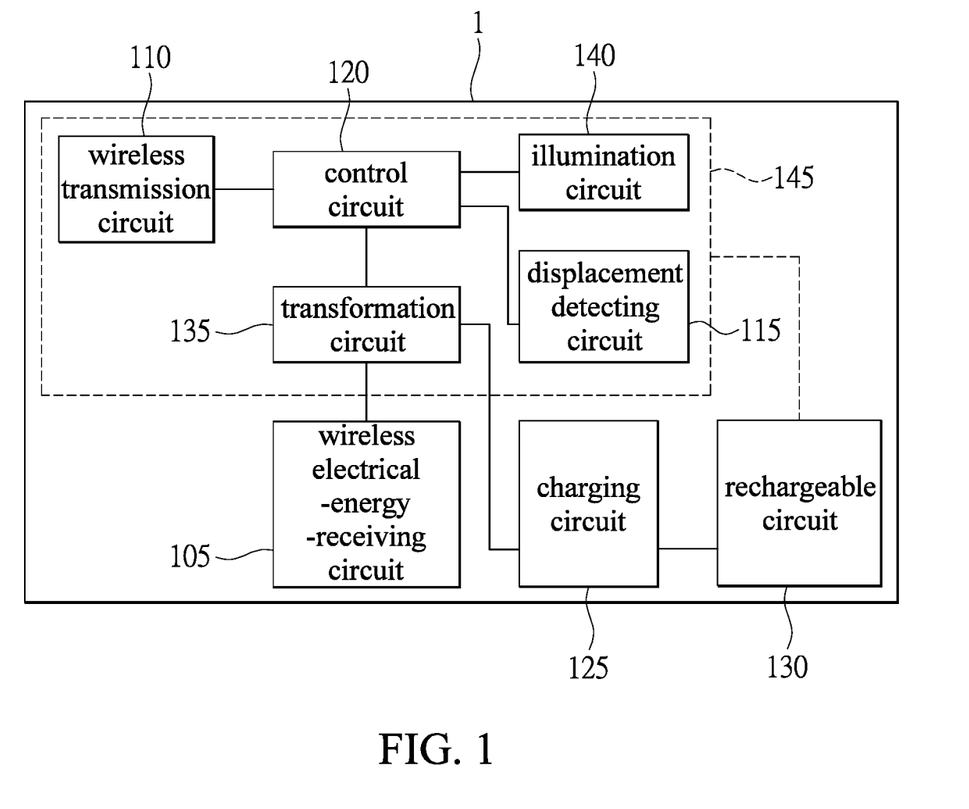
FIG. 1 is a block diagram illustrating the circuit of a rechargeable wireless mouse according to an embodiment of the present disclosure.

Please refer to FIG. 1, which is a block diagram illustrating the circuit of a rechargeable wireless mouse according to an embodiment of the present disclosure. A rechargeable wireless mouse 1 includes a wireless electrical-energy-receiving circuit 105, a charging circuit 125, a rechargeable battery 130, and an operating circuit 145. The operating circuit 145 includes a wireless transmission circuit 110, a displacement detecting circuit 115, a control circuit 120, a transformation circuit 135, and an illumination circuit 140. The control circuit 120 is electrically connected to the wireless transmission circuit 110, the displacement detecting circuit 115, the transformation circuit 135, and the illumination circuit 140. The operating circuit 145 is electrically connected to the rechargeable battery 130 so as to receive electrical energy from the rechargeable battery 130.

The wireless electrical-energy-receiving circuit 105 wirelessly receives electromagnetic energy from the charging plate (not shown in the drawings). The wireless electrical-energy-receiving circuit 105 includes a resonant circuit and a magnetic coil. When the electromagnetic energy emitting end and the electromagnetic energy receiving end have the same resonant frequency, the electromagnetic energy emitting end and the electromagnetic energy receiving end achieve resonant magnetic coupling. More specifically, when the magnetic coil of the wireless electrical-energy-receiving circuit 105 of the present embodiment electromagnetically couples to a magnetic coil of the wireless electrical-energy-emitting circuit of a charging plate, the rechargeable wireless mouse 1 wirelessly receives the electromagnetic energy of the charging plate. The wireless electrical-energy-receiving circuit 105 is electrically connected to the transformation circuit 135, and the transformation circuit 135 transforms electromagnetic energy into electric potential energy. The control circuit 120 receives electric potential energy transmitted by the transformation circuit 135 and generates signals according to the electric potential energy. The control circuit 120 outputs a control signal through the wireless transmission circuit 110 to the charging plate. When the charging plate receives the control signal, the charging plate controls the duty cycle and outputs charging power.

Specifically, when the control circuit 120 receives an electric potential energy that is higher than a predetermined electric potential energy from the transformation circuit 135, the rechargeable wireless mouse 1 transmits a first control signal to the charging plate. The first control signal controls the charging plate so that the charging power is in the first charging mode. When the control circuit 120 receives an electromagnetic energy from the rechargeable battery 130 that is lower than the predetermined electric potential energy, the rechargeable wireless mouse 1 transmits a second control signal to the charging plate. The second control signal controls the charging plate so that the charging power is in the second charging mode. Furthermore, the control signal controls the charging plate so that the charging power received by the rechargeable wireless mouse 1 switches between the first charging mode and the second charging mode, in which the charging power of the first charging mode is higher than that of the second charging mode. The duty ratio of the first charging mode is 90%, and the duty ratio of the second charging mode is 50%; however, the present disclosure is not limited thereto.

Moreover, when in the first charging mode, the charging power is outputted in a first duty cycle by the charging plate to the rechargeable wireless mouse 1, and when in the second charging mode, the charging power is outputted in a second duty cycle by the charging plate to the rechargeable wireless mouse 1, in which the first duty cycle is greater than the second duty cycle. In one embodiment, the first duty cycle is 1, and the second duty cycle is 0.5. In other words, the ratio of the charging time to non-charging time of the first duty cycle is 100%, and that of the second duty cycle is 50%. The present disclosure is not limited by the duty ratio. The control circuit 120 generates different control signals according to the electric potential energy. When receiving the control signals via the wireless transmission circuit 110 of the rechargeable wireless mouse 1, the charging plate dynamically adjusts the charging mode of the rechargeable wireless mouse 1 between the first charging mode and the second charging mode.

The charging circuit 125 is electrically connected to the rechargeable battery 130 and the transformation circuit 135. The charging circuit 125 charges the rechargeable battery 130 with the electric potential energy outputted by the transformation circuit 135. More specifically, the circuit structure of the charging circuit 125 has wave filtering and rectification capability so that the electric potential energy outputted by the transformation circuit 135 is filtered and rectified and then transmitted to the rechargeable battery 130 as electrical energy to be stored therein. The rechargeable battery 130 provides electric energy for the wireless transmission circuit 110, the displacement detecting circuit 115, the control circuit 120, the transformation circuit 135, and the illumination circuit 140 of the operating circuit 145.

When the electric potential energy outputted by the transformation circuit 135 to the control circuit 120 is higher than a predetermined electric potential energy, the control circuit 120 activates the displacement detecting circuit 115 and the illumination circuit 140. In one embodiment of the present disclosure, when the electric potential energy outputted by the transformation circuit 135 to the control circuit 120 is higher than the predetermined electric potential energy and the duration of time in which the transformation circuit 135 outputs electric potential energy exceeds a predetermined time, the control circuit 120 activates the displacement detecting circuit 115 and the illumination circuit 140. The displacement detecting circuit 115 detects the variation in the displacement of the rechargeable wireless mouse 1, in which the detection method can be an optical detection method which measures the displacement value and determines the direction of the displacement of the rechargeable wireless mouse 1; however, the present disclosure is not limited thereto. For instance, when the charging plate outputs a charging power in the first charging mode to the rechargeable wireless mouse 1, the control circuit 120 activates the light-emitting diode of the illumination circuit 140. A person skilled in the art possesses the knowledge that the predetermined electric potential energy ranges from 3.3 V to 5 V. The light-emitting diode can be disposed on the lateral side of the rechargeable wireless mouse 1 or on the button or the scroll wheel thereof; the present disclosure is not limited thereto.

The light source unit (not shown in the drawings) of the displacement detecting circuit 115 can be a laser or an infrared emitter that emits light onto a surface, and the receiver unit (not shown in the drawings) of the displacement detecting circuit 115 receives the laser light or infrared light reflected by the surface and calculates the displacement value and the direction of the displacement of the rechargeable wireless mouse 1 according to the difference between the incident light and the reflected light. The present disclosure is not limited to any particular type of light source. The control circuit 120 generates a displacement detecting signal according to a detection result of the displacement detecting circuit 115, and the charging circuit 125 transmits the displacement detecting signal to a wireless receiver (not shown in the drawings) via the wireless transmission circuit 110. In one embodiment, the wireless receiver is exemplified as the dongle inserted on a USB socket of a compute. In another embodiment, the wireless receiver is disposed inside the computer. The wireless transmission circuit 110 is equipped with wireless communication modules such as Bluetooth or radiofrequency.

Figure 2:
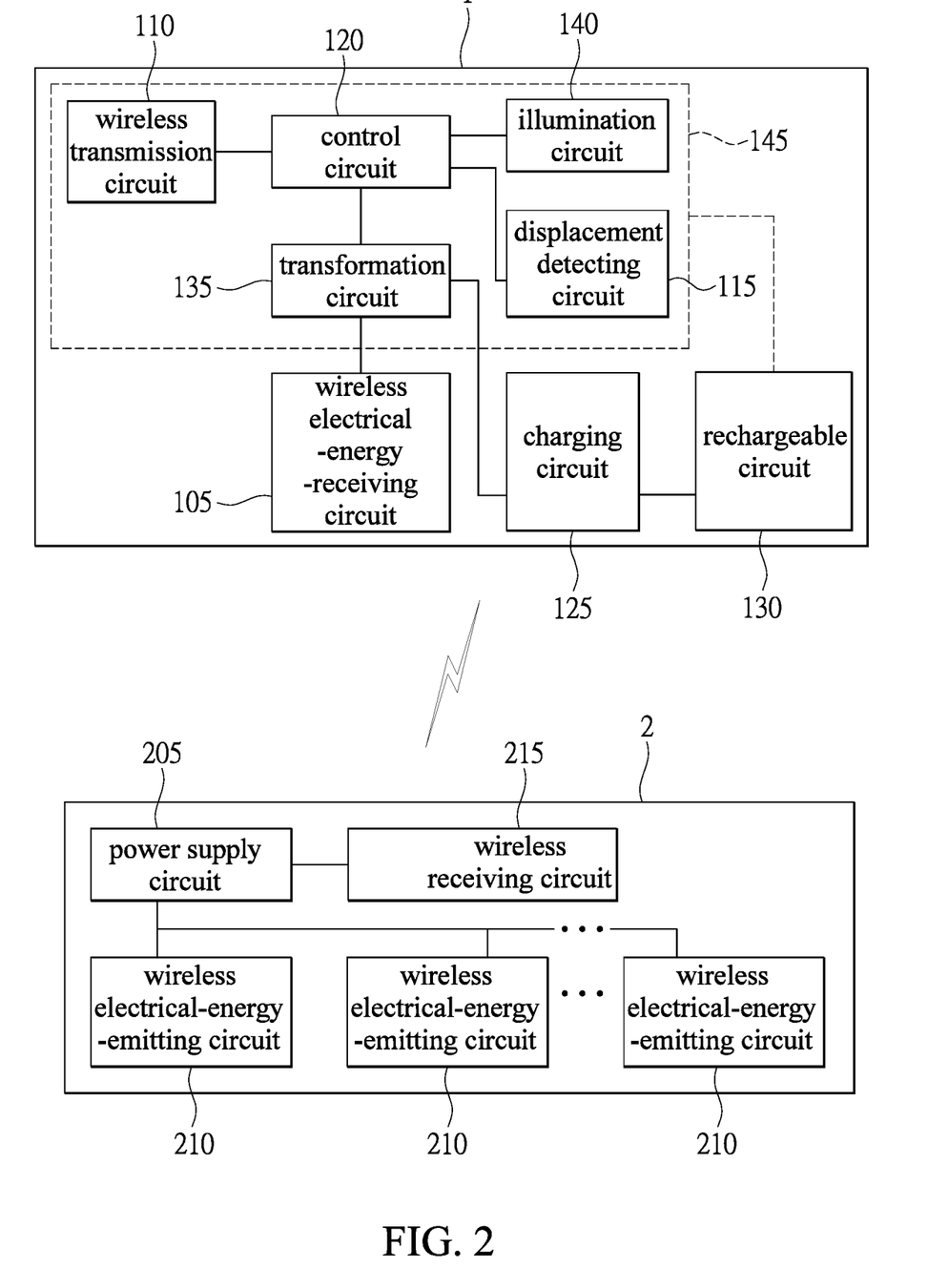
FIG. 2 is a block diagram illustrating the circuit of the rechargeable wireless mouse according to the embodiment of the present disclosure.

Please refer to FIG. 2, which is a block diagram illustrating the circuit of the rechargeable wireless mouse according to the embodiment of the present disclosure. A charging plate 2 wirelessly transmits electromagnetic energy to the rechargeable wireless mouse 1. The rechargeable wireless mouse 1 includes the wireless electrical-energy-receiving circuit 105, the charging circuit 125, the rechargeable battery 130, and the operating circuit 145. The operating circuit 145 includes the wireless transmission circuit 110, the displacement detecting circuit 115, the control circuit 120, the transformation circuit 135, and the illumination circuit 140.

Please refer to FIG. 1 for details regarding the rechargeable wireless mouse 1, which will not be further described herein.

The charging plate 2 includes a power supply circuit 205, a plurality of wireless electrical-energy-emitting circuits 210 and a wireless receiving circuit 215. The power supply circuit 205 is electrically connected to each of the wireless electrical-energy-emitting circuits 210 and the wireless receiving circuit 215. The wireless receiving circuit 215 of the charging plate 2 receives the control signal transmitted by the wireless transmission circuit 110 of the rechargeable wireless mouse 1. The power supply circuit 205 then adjusts the charging power of each of the wireless electrical-energy-emitting circuits 210 according to the control signal. The wireless electrical-energy-emitting circuit 210 includes a resonant circuit and a magnetic coil, and when the magnetic coil of the wireless electrical-energy-receiving circuit 105 electromagnetically couples to the magnetic coil of the wireless electrical-energy-emitting circuit 210 of the charging plate 2, the rechargeable wireless mouse 1 receives electromagnetic energy from the charging plate 2. Specifically, the power supply circuit 205 is connected to an external power supply through connection terminals, in which the connection terminals are exemplified as a universal serial bus (USB).

Figure 3:
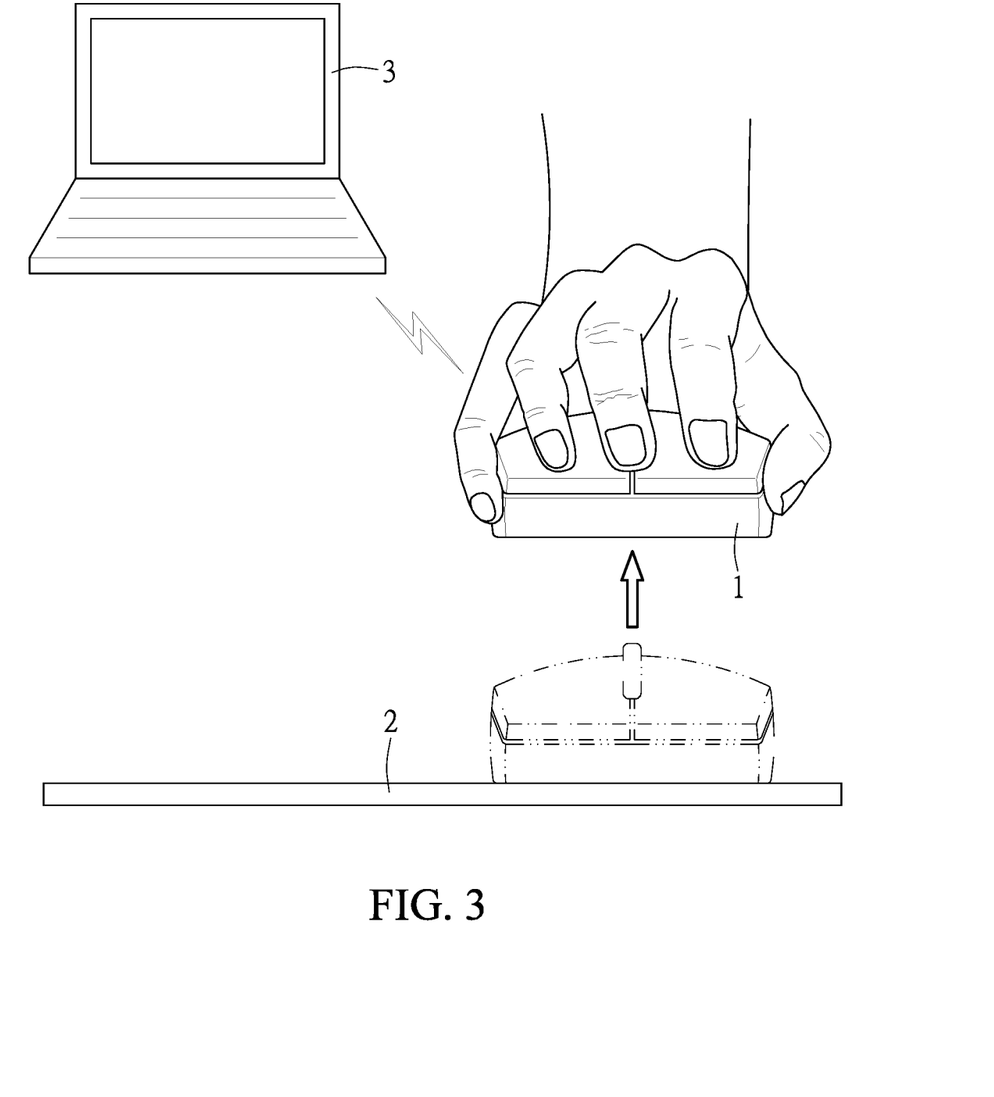
FIG. 3 is a schematic diagram illustrating the rechargeable wireless mouse according to the embodiment of the present disclosure being used.

Reference is made to FIGS. 2 and 3, in which FIG. 3 is a schematic diagram illustrating the rechargeable wireless mouse according to the embodiment of the present disclosure being used. In the present embodiment, a user can use the rechargeable wireless mouse 1 to control the motion of the cursor. When the distance between the rechargeable wireless mouse 1 and the charging plate 2 is smaller than a predetermined distance, the electric potential energy detected by the control circuit 120 through the transformation circuit 135 is higher than the predetermined electric potential energy. Accordingly, the control circuit 120 determines that the rechargeable wireless mouse 1 is close to the charging plate 2, and the control circuit 120 outputs a first control signal to the wireless receiving circuit 215, and then the charging plate 2 switches from the second charging mode to the first charging mode. Furthermore, the charging power of the first charging mode is higher than that of the second charging mode. In other words, when the control circuit 120 determines that the rechargeable wireless mouse 1 is close to the charging plate 2, the charging plate 2 charges the rechargeable wireless mouse 1 with higher charging power, and when the control circuit 120 determines that the rechargeable wireless mouse 1 is far from the charging plate 2, the charging plate 2 provides lower charging power. In this way, the present disclosure provides a wireless charging device that dynamically adjusts the charging mode of the charging plate 2 so as to reduce the amount of power consumption of the charging plate 2.

Figure 4:
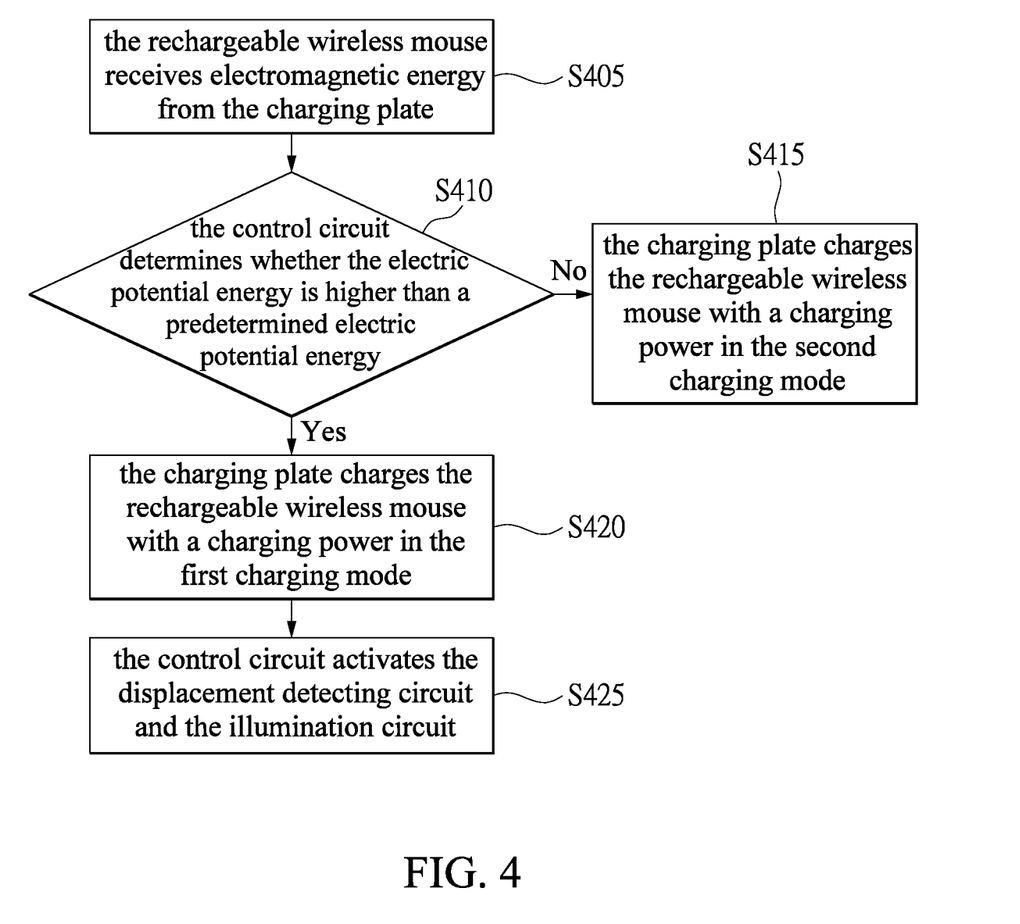
FIG. 4 is a flow chart illustrating a method of charging the rechargeable wireless mouse according to the embodiment of the present disclosure.

Please refer to FIGS. 2 and 4, in which FIG. 4 is a flow chart illustrating a method of charging the rechargeable wireless mouse according to the embodiment of the present disclosure. In step S405, the rechargeable wireless mouse 1 receives electromagnetic energy from the charging plate 2. When one of the wireless electrical-energy-emitting circuits 210 electromagnetically couples to the wireless electrical-energy-receiving circuit 105 of the rechargeable wireless mouse 1, the wireless electrical-energy-receiving circuit 105 of the rechargeable wireless mouse 1 receives electromagnetic energy emitted by one of the wireless electrical-energy-emitting circuits 210 of the charging plate 2.

In step S410, the control circuit 120 determines whether the electric potential energy is higher than a predetermined electric potential energy. If not, step S415 follows. If so, step S420 follows. Furthermore, the rechargeable wireless mouse 1 outputs a control signal to the charging plate 2 according to the condition of the rechargeable wireless mouse 1 receiving an electromagnetic energy from the charging plate 2. When the distance between the rechargeable wireless mouse 1 and the charging plate 2 is smaller than a predetermined distance, the electromagnetic energy received by the rechargeable wireless mouse 1 from the charging plate 2 is higher than a predetermined electromagnetic energy, and the electric potential energy generated by the transformation circuit 135 is higher than a predetermined electric potential energy. Accordingly, the rechargeable wireless mouse 1 outputs a first control signal to the charging plate 2, which provides the first charging mode upon receiving the first control signal. On the other hand, when the rechargeable wireless mouse 1 leaves the charging plate 2 and the distance therebetween is smaller than a predetermined distance, the electromagnetic energy received by the rechargeable wireless mouse 1 from the charging plate 2 is lower than a predetermined electromagnetic energy, and the electric potential energy generated by the transformation circuit 135 is lower than a predetermined electric potential energy. Accordingly, the rechargeable wireless mouse 1 outputs a second control signal to the charging plate 2, which provides the second charging mode upon receiving the second control signal. The charging power supplied by the charging plate 2 and received by the rechargeable wireless mouse 1 switches between a first charging mode and a second charging mode according to the control signal, in which the charging power of the first charging mode is higher than that of the second charging mode. When in the first charging mode, the charging power is outputted in a first duty cycle by the charging plate 2, and when in the second charging mode, the charging power is outputted in a second duty cycle by the charging plate 2. The first duty cycle is greater than the second duty cycle.

In step S415, the charging plate 2 charges the rechargeable wireless mouse 1 with a charging power in the second charging mode. The control circuit 120 determines that the electric potential energy outputted by the transformation circuit 135 is lower than a predetermined electric potential energy, and the rechargeable wireless mouse 1 transmits a second control signal to the charging plate 2, in which the second control signal controls the charging plate 2 in a manner such that the charging plate 2 charges the rechargeable wireless mouse 1 with a charging power in the second charging mode.

In step S420, the charging plate 2 charges the rechargeable wireless mouse 1 with a charging power in the first charging mode. The control circuit 120 determines that the electric potential energy outputted by the transformation circuit 135 is higher than a predetermined electric potential energy, and the rechargeable wireless mouse 1 transmits a first control signal to the charging plate 2, in which the first control signal controls the charging plate 2 in a manner such that the charging plate 2 charges the rechargeable wireless mouse 1 with a charging power in the first charging mode.

In step S425, the control circuit 120 activates the displacement detecting circuit 115 and the illumination circuit 140. When the rechargeable wireless mouse 1 outputs a first control signal, which controls the charging plate 2 in a manner such that the charging plate 2 charges the rechargeable wireless mouse 1 with a charging power in the first charging mode, the control circuit 120 activates the displacement detecting circuit 115 and the illumination circuit 140.

In summary, when the control circuit of the rechargeable wireless mouse provided by the present disclosure determines that the electric potential energy is higher than a predetermined electric potential energy, the control circuit transmits a control signal to the charging plate through the wireless transmission circuit so that the charging plate provides a first charging mode, and when the control circuit determines that the electric potential energy is lower than the predetermined electric potential energy, the control circuit transmits a control signal to the charging plate through the wireless transmission circuit so that the charging plate provides a second charging mode. In this way, the present disclosure dynamically adjusts the charging mode so as to reduce the amount of power consumption of the charging plate. In addition, when the charging plate provides the first charging mode, the illumination circuit is activated so that the user can be reminded that the rechargeable wireless mouse is being charged, and the functionality of the rechargeable wireless mouse can thus be widened.

The description illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A rechargeable wireless mouse, comprising:
   a wireless electrical-energy-receiving circuit that wirelessly receives an electromagnetic energy from a charging plate;
   a transformation circuit electrically connected to the wireless electrical-energy-receiving circuit, the transformation circuit transforming the electromagnetic energy into an electric potential energy;
   a wireless transmission circuit transmitting a control signal to the charging plate;
   a control circuit electrically connected to the transformation circuit and the wireless transmission circuit, the control circuit receiving the electric potential energy transmitted by the transformation circuit and outputting the control signal to the charging plate via the wireless transmission circuit according to the electric potential energy; and
   a displacement detecting circuit electrically connected to the control circuit, the displacement detecting circuit detecting the variation in the displacement of the rechargeable wireless mouse;
   wherein the control signal controls the charging plate in a manner such that the charging power supplied by the charging plate and received by the rechargeable wireless mouse switches between a first charging mode and a second charging mode, the charging power of the first charging mode being higher than that of the second charging mode;
   wherein when the electric potential energy is higher than a predetermined potential energy, the control circuit activates the displacement detecting circuit.

2. The rechargeable wireless mouse according to claim 1, wherein when in the first charging mode, the charging power is outputted in a first duty cycle by the charging plate, and when in the second charging mode, the charging power is outputted in a second duty cycle by the charging plate.

3. The rechargeable wireless mouse according to claim 1, wherein when the electric potential energy is higher than a predetermined electric potential energy, the rechargeable wireless mouse transmits a first control signal to the charging plate, in which the first control signal controls the charging plate so that the charging power is in the first charging mode.

4. The rechargeable wireless mouse according to claim 1, wherein when the electric potential energy is lower than a predetermined electric potential energy, the rechargeable wireless mouse transmits a second control signal to the charging plate, in which the second control signal controls the charging plate so that the charging power is in the second charging mode.

5. The rechargeable wireless mouse according to claim 1, further comprising:
   an illumination circuit electrically connected to the control circuit,
   wherein when the electric potential energy is higher than the predetermined potential energy, the control circuit activates the illumination circuit.

6. The rechargeable wireless mouse according to claim 1, further comprising:
   a rechargeable battery; and
   a charging circuit electrically connected to the transformation circuit and the rechargeable battery, the rechargeable battery charging the rechargeable battery with the electric potential energy outputted by the transformation circuit.

7. A wireless charging device, comprising:
   a charging plate, and
   a rechargeable wireless mouse including:
   a wireless electrical-energy-receiving circuit that wirelessly receives an electromagnetic energy from a charging plate;
   a transformation circuit electrically connected to the wireless electrical-energy-receiving circuit, the transformation circuit transforming the electromagnetic energy into an electric potential energy;
   a wireless transmission circuit that transmits a control signal to the charging plate;
   a control circuit electrically connected to the transformation circuit and the wireless transmission circuit, the control circuit receiving the electric potential energy transmitted by the transformation circuit and outputting the control signal to the charging plate via the wireless transmission circuit according to the electric potential energy; and
   a displacement detecting circuit electrically connected to the control circuit, the displacement detecting circuit detecting the variation in the displacement of the rechargeable wireless mouse;
   wherein the control signal controls the charging plate in a manner such that the charging power supplied by the charging plate and received by the rechargeable wireless mouse switches between a first charging mode and a second charging mode, the charging power of the first charging mode being higher than that of the second charging mode;
   wherein when the electric potential energy is higher than a predetermined potential energy, the control circuit activates the displacement detecting circuit.

8. The wireless charging device according to claim 7, wherein when in the first charging mode, the charging power is outputted in a first duty cycle by the charging plate, and when in the second charging mode, the charging power is outputted in a second duty cycle by the charging plate.

9. The wireless charging device according to claim 7, wherein when the electric potential energy is higher than a predetermined electric potential energy, the rechargeable wireless mouse transmits a first control signal to the charging plate, in which the first control signal controls the charging plate so that the charging power is in the first charging mode.

10. The rechargeable wireless mouse according to claim 7, wherein when the electric potential energy is lower than a predetermined electric potential energy, the rechargeable wireless mouse transmits a second control signal to the charging plate, in which the second control signal controls the charging plate so that the charging power is in the second charging mode.

11. The rechargeable wireless mouse according to claim 7, further comprising:
    an illumination circuit electrically connected to the control circuit,
    wherein when the electric potential energy is higher than the predetermined potential energy, the control circuit activates the illumination circuit.

12. The rechargeable wireless mouse according to claim 7, further comprising:
    a rechargeable battery; and
    a charging circuit electrically connected to the transformation circuit and the rechargeable battery, the rechargeable battery charging the rechargeable battery with the electric potential energy outputted by the transformation circuit.

13. A method for charging a rechargeable wireless mouse applicable to a charging plate that charges the rechargeable wireless mouse, comprising:
    the rechargeable wireless mouse outputting a control signal to the charging plate according to the condition of the rechargeable wireless mouse receiving an electric potential energy transformed from an electromagnetic energy from the charging plate; and
    the charging plate supplying the rechargeable wireless mouse with a charging power according to the control signal, in which the charging power switches between a first charging mode and a second charging mode, the charging power of the first charging mode being higher than that of the second charging mode;
    wherein when the electric potential energy is higher than a predetermined electric potential energy, a control circuit of the rechargeable wireless mouse activates a displacement detecting circuit of the rechargeable wireless mouse;
    wherein the displacement detecting circuit detecting the variation in the displacement of the rechargeable wireless mouse.

14. The method according to claim 13, wherein when in the first charging mode, the charging power is outputted in a first duty cycle by the charging plate, and when in the second charging mode, the charging power is outputted in a second duty cycle by the charging plate.

15. The method according to claim 13, wherein when the electric potential energy is higher than the predetermined electric potential energy, the rechargeable wireless mouse transmits a first control signal to the charging plate, in which the first control signal controls the charging plate so that the charging power is in the first charging mode.

16. The method according to claim 13, wherein when the electric potential energy is lower than a predetermined electric potential energy, the rechargeable wireless mouse transmits a second control signal to the charging plate, in which the second control signal controls the charging plate so that the charging power is in the second charging mode.

17. The method according to claim 13, wherein when the charging plate supplies the rechargeable wireless mouse with the charging power in the first charging mode according to the control signal, a control circuit activates an illuminating circuit.

* * * * *